United States Patent [19]
Tylosky

[11] Patent Number: 5,588,464
[45] Date of Patent: Dec. 31, 1996

[54] GAS SHUT-OFF VALVE

[76] Inventor: Gordon Tylosky, 3461 53rd Ave. West, Mukilteo, Wash. 98275

[21] Appl. No.: 402,843

[22] Filed: Mar. 13, 1995

[51] Int. Cl.$^6$ .......................... E03B 1/00; F16K 31/143
[52] U.S. Cl. ........................................ 137/613; 251/63.4
[58] Field of Search ...................... 137/613; 251/30.01, 251/63.4, 280

[56] References Cited

U.S. PATENT DOCUMENTS

| | | |
|---|---|---|
| 2,620,820 | 12/1952 | Born . |
| 2,637,331 | 5/1953 | Sullivan . |
| 2,729,285 | 1/1956 | Ray ...................................... 137/613 X |
| 2,812,770 | 11/1957 | Sullivan . |
| 2,839,929 | 6/1958 | Hurlburt, Jr. . |
| 2,875,616 | 3/1959 | Marks . |
| 2,881,787 | 4/1959 | Sullivan . |
| 3,056,424 | 10/1962 | Courtot et al. . |
| 3,259,357 | 7/1966 | Sharp . |
| 3,613,725 | 10/1971 | Hughes ................................... 137/613 |
| 3,623,506 | 11/1971 | Bonner .................................. 137/613 |
| 3,842,858 | 10/1974 | Bobo . |
| 4,242,082 | 12/1980 | Branson et al. .................. 201/63.4 X |
| 5,209,252 | 5/1993 | Perle . |
| 5,209,454 | 5/1993 | Engdahl et al. . |

FOREIGN PATENT DOCUMENTS 2038998 7/1980 United Kingdom ................... 251/280

Primary Examiner—Hoang Nguyen
Attorney, Agent, or Firm—Richard C. Litman

[57] ABSTRACT

An automatic safety shut-off system for installation in a gas line or other fluid line which automatically shuts off the flow of fluid in response to an emergency situation. The system is characterized by three valves, each responsive to a different emergency situation. The first valve includes a sealing piston which is controlled by a pressure responsive locking mechanism which responds to above normal gas line pressure. The second valve responds to lower than normal pressure downstream of the shut-off system. The third valve responds to the interruption of electrical power supplied to machinery using fluid from the gas line. The pressure responsive locking mechanism of the first valve includes two locking toggle joints movable between a locked and an unlocked position. When in the locked position, the toggle joints retain the sealing piston in the open position, thereby allowing fluid flow through the valve. When in the unlocked position, the toggle joints allow the sealing piston to close, thereby interrupting fluid flow through the valve. A pressure responsive locking piston is linked to the toggle pins of the toggle joints and is movable between a locked position, locking the toggle joints, and an unlocked position, unlocking the toggle joints, whereby above normal fluid pressure in the valve chamber of the first valve causes movement of the locking piston from the locked position to the unlocked position.

18 Claims, 5 Drawing Sheets

GAS SHUT-OFF VALVE

BACKGROUND OF THE INVENTION

1. Field of the Invention

The present invention relates to valves for automatically shutting off the flow of fluids in response to an emergency situation.

2. Description of the Prior Art

Natural gas is increasingly being used as a source of energy by both residential and commercial consumers due to its convenience, cleanliness, and efficiency. Natural gas can be used for heating, cooling, and cooking, and is quickly replacing oil and coal as the preferred energy source in many parts of the country. An important reason for its growth in popularity lies in the ease of delivery in which it can be supplied to a consumer. Instead of relying on periodic deliveries which can be hindered by inclement weather, gas is typically piped directly to the consumer. Most new communities are being constructed with the exclusive use of natural gas in mind, by installing extensive gas line networks to serve the current or future residents.

Despite the convenience of natural gas, it also presents a significant danger. Since natural gas is highly flammable, a rupture in the gas lines resulting in gas leakage can cause catastrophic damage to adjacent structures due to fires or explosions. Gas flowing in gas lines is susceptible to fluctuations in pressure due to the varying loads imposed on the gas line by the consumer, to leaks present in the lines, and other conditions beyond the control of the supplying utility. Due to these fluctuations, there have been instances where the pressure on a consumer's premises have been too low or too high for safe operation. A low pressure is dangerous because pilot lights or operating burners may become extinguished, which would result in gas filling the premises when the gas pressure again increases, thereby possibly causing an explosion or asphyxiation of the consumer. A high pressure is likewise dangerous because the equipment conveying and using the gas may break, thus placing the life and property of the consumer in jeopardy.

These dangers are most acute in areas of the country which experience periodic earthquakes or other seismic disturbances that cause buried pipelines to rupture. For example, a large percentage of homes during recent earthquakes in California and in Japan were consumed by fires started from leakage from ruptured gas lines. Earthquake preparedness experts caution all natural gas consumers to promptly close of all gas lines entering a structure shortly after experiencing an earthquake. By closing off gas lines, the amount of gas which could leak into the structure can be minimized, and the consequent risk of fire reduced.

Automatic shut-off valves which close off the gas line in response to a seismic disturbance are well known in the art. A common feature of many of such automatic valves is the use of a ball which can be dislodged by seismic disturbance and which falls into a valve seat position, thereby blocking flow through the valve structure. Example of such automatic shut-off valves are seen in U.S. Pat. No. 2,637,331, issued to Timothy J. Sullivan on May 5, 1953, and U.S. Pat. No. 5,209,252, issued to Cery B. Perle on May 11, 1993. U.S. Pat. No. 2,812,770, issued to Timothy J. Sullivan on Nov. 12, 1957, describes a solenoid operated safety cut-off valve having a pressure responsive diaphragm and a shock sensitive ball valve.

U.S. Pat. No. 5,209,454, issued to Paul D. Engdahl et al. on May 11, 1993, shows a safety shutoff valve having a pivoted flapper arm held in the open position by a permanent magnet embedded therein. When the magnetic attractive force is reduced enough, the arm swings down by gravity into the closed position. The magnetic attractive force is reduced by an opposing electromagnet or by mechanical displacement of a ferromagnetic ball.

Other automatic shut-off valves close off the gas line in response to a sudden increase or decrease in pressure in the gas line or in response to a failure of the electrical power supply. A common feature of such automatic shut-off valves is the use of a flexible diaphragm which responds to a sudden increase or decrease of pressure by moving to seal off the valve. Examples of such valves are seen in U.S. Pat. No. 2,620,820, issued to Paul L. Born on Dec. 9, 1952; U.S. Pat. No. 3,056,424, issued to Louis B. Courtot et al. on Oct. 2, 1962; and U.S. Pat. No. 3,842,858, issued to Frank E. Bobo on Oct. 22, 1974. U.S. Pat. No. 2,881,787, issued to Timothy J. Sullivan on Apr. 14, 1959, describes a safety control valve having two solenoid controlled pressure responsive diaphragms. The valve in its open position is responsive to low and high supply pressure and will automatically close upon variations thereof from a predetermined set level. In addition, the valve will automatically close upon failure of the electrical power supply.

Further examples of shut-off valves which close the gas line in response to failure of the power supply may be seen in U.S. Pat. No. 2,839,929, issued to Wilbur F. Hurlburt, Jr. on Jun. 24, 1958; U.S. Pat. No. 2,875,616, issued to George M. Marks on Mar. 3, 1959; and U.S. Pat. No. 3,259,357, issued to Karl F. Sharp on Jul. 5, 1966. Hurlburt shows a solenoid operated valve mechanism that includes a manual reset handle which can be tripped in response to a departure from a normal or predetermined condition, including power failure. Marks illustrates a solenoid controlled safety-cut off valve. When the solenoid is energized the valve is in the open position. Upon loss of power, the solenoid is deactivated and the valve is closed. Sharp shows an automatic shut-off valve having a latch element which is subject to positive impact force when circuit failure is detected. The impact force is supplied by an impact head powered by a spring which is released upon failure of the circuit.

However, none of the above referenced patents show an automatic safety shut-off system having a first valve including a sealing piston that is controlled by a pressure responsive locking mechanism which responds to above normal gas line pressure, a second valve responsive to lower than normal pressure downstream of the shut-off system, and a third valve responsive to interruption of electrical power supplied to machinery using fluid from the gas line.

None of the above inventions and patents, taken either singly or in combination, is seen to describe the instant invention as claimed.

SUMMARY OF THE INVENTION

The present invention is directed to an automatic safety shut-off system for installation in a gas line or other fluid line which automatically shuts off the flow of fluid in response to an emergency situation. The system is characterized by three valves, each responsive to a different emergency situation. The first valve includes a sealing piston that is controlled by a pressure responsive locking mechanism which responds to above normal gas line pressure. The second valve responds to lower than normal pressure downstream of the shut-off system. The third valve responds to the interruption of electrical power supplied to machinery using fluid from the gas line.

In a preferred embodiment of the invention, the pressure responsive locking mechanism includes two locking toggle joints movable between a locked and an unlocked position. When in the locked position, the toggle joints retain the sealing piston in the open position, thereby allowing fluid flow through the valve. When in the unlocked position, the toggle joints allow the sealing piston to close, thereby interrupting fluid flow through the valve. A pressure responsive locking piston is linked to the toggle pins of the toggle joints and is movable between a locked position, locking the toggle joints, and an unlocked position, unlocking the toggle joints, whereby above normal fluid pressure in the valve chamber of the first valve causes movement of the locking piston from the locked position to the unlocked position.

Accordingly, it is a principal object of the invention to provide a valve system adapted to be inserted in a fluid line and operable automatically to terminate the flow of gas in the line in response to emergency situations.

It is another object of the invention to provide an automatic shut-off valve adapted for insertion into a fluid line which must be manually reset to open after removal of all abnormal conditions causing closure.

It is a further object of the invention to provide a safety shut-off valve which closes automatically upon a sudden increase of fluid supply pressure or upon a sudden decrease of fluid pressure downstream of the valve.

Still another object of the invention is to provide a safety shut-off valve which closes automatically in the event of electrical power failure.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
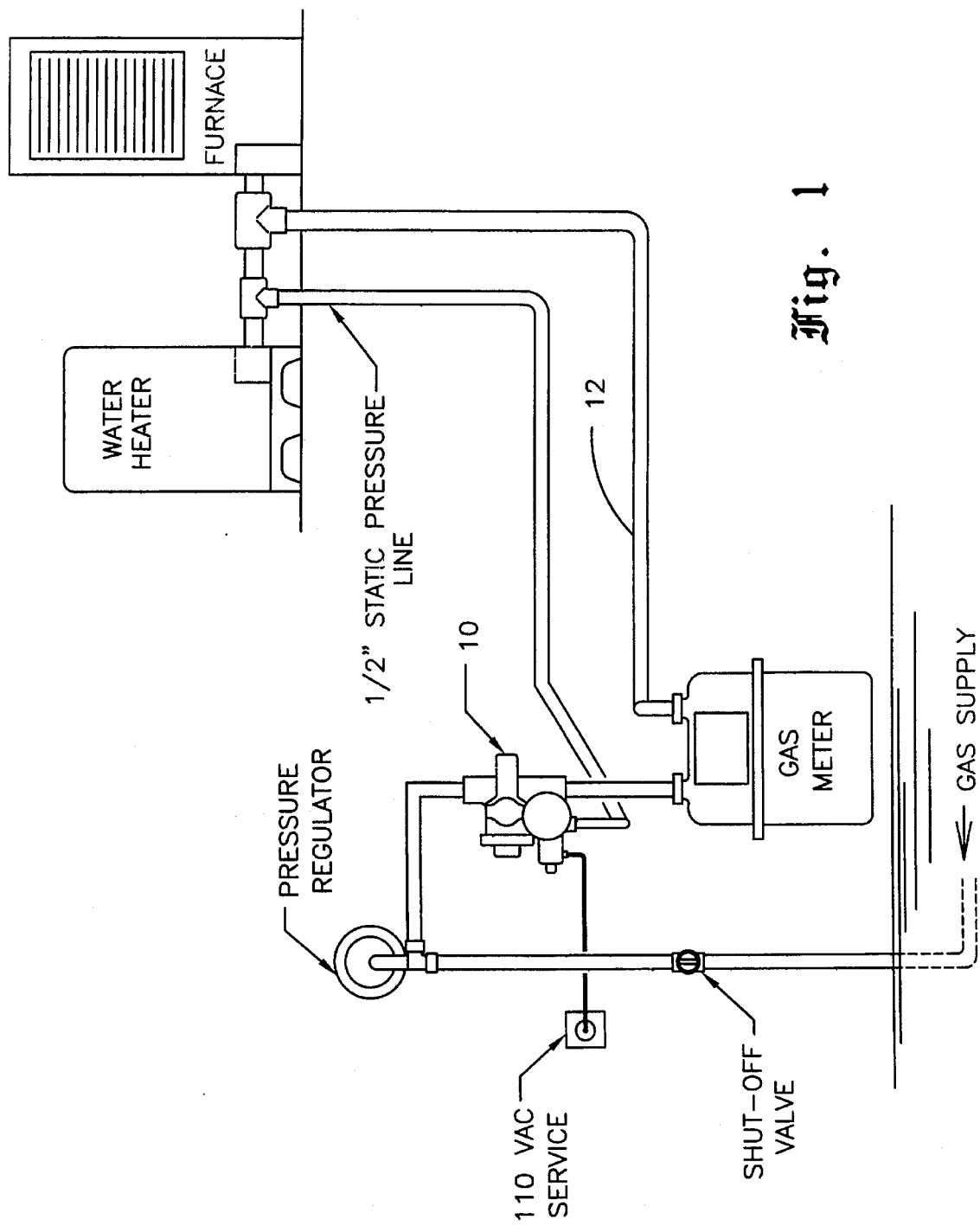
FIG. 1 is a schematic diagram of the gas shut-off system, showing the system installed in a typical domestic gas supply system.
Figure 2:
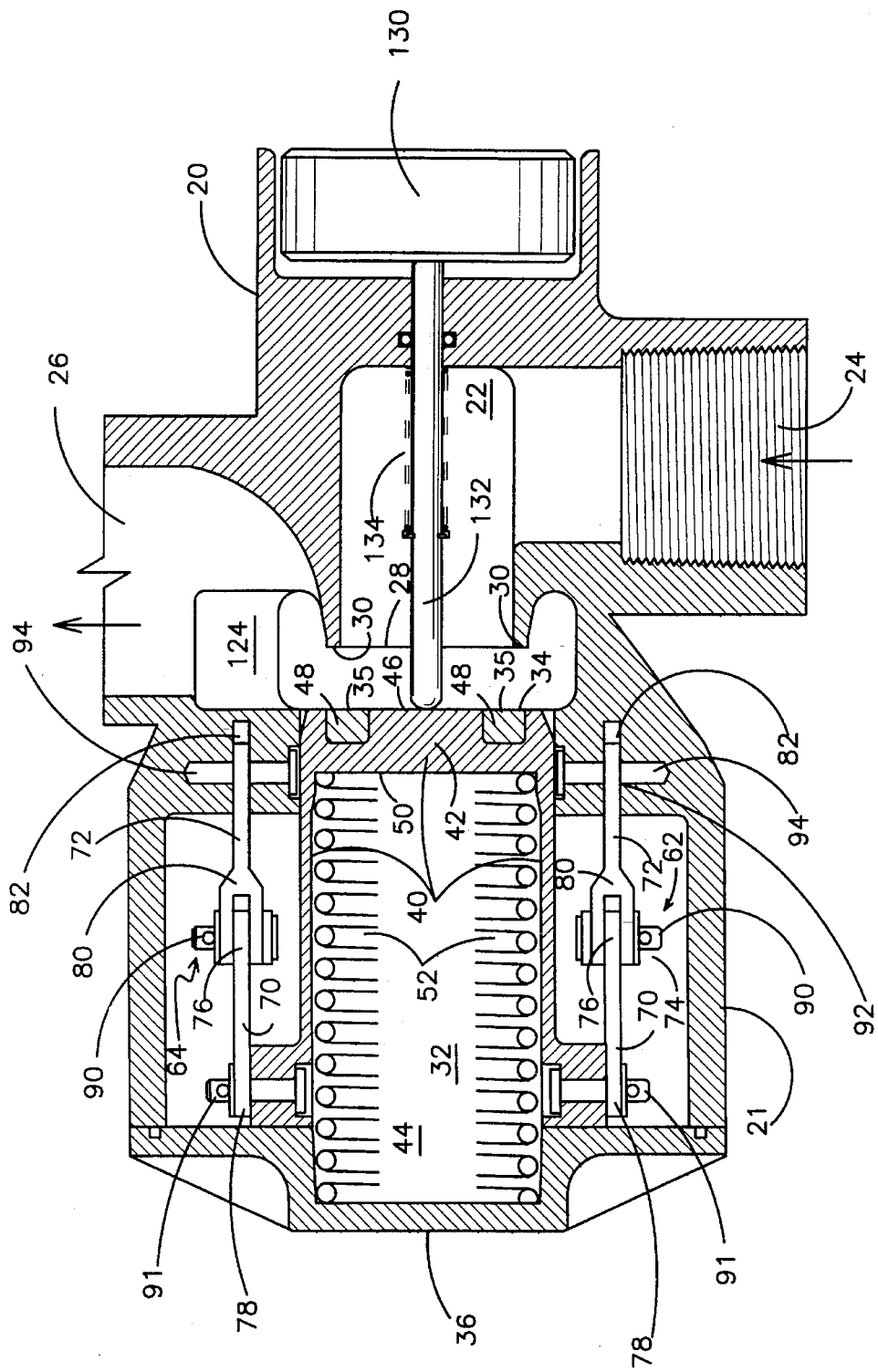
FIG. 2 is a top view, in cross section, of the first valve taken along the lines 2—2 of FIG. 5.
Figure 3:
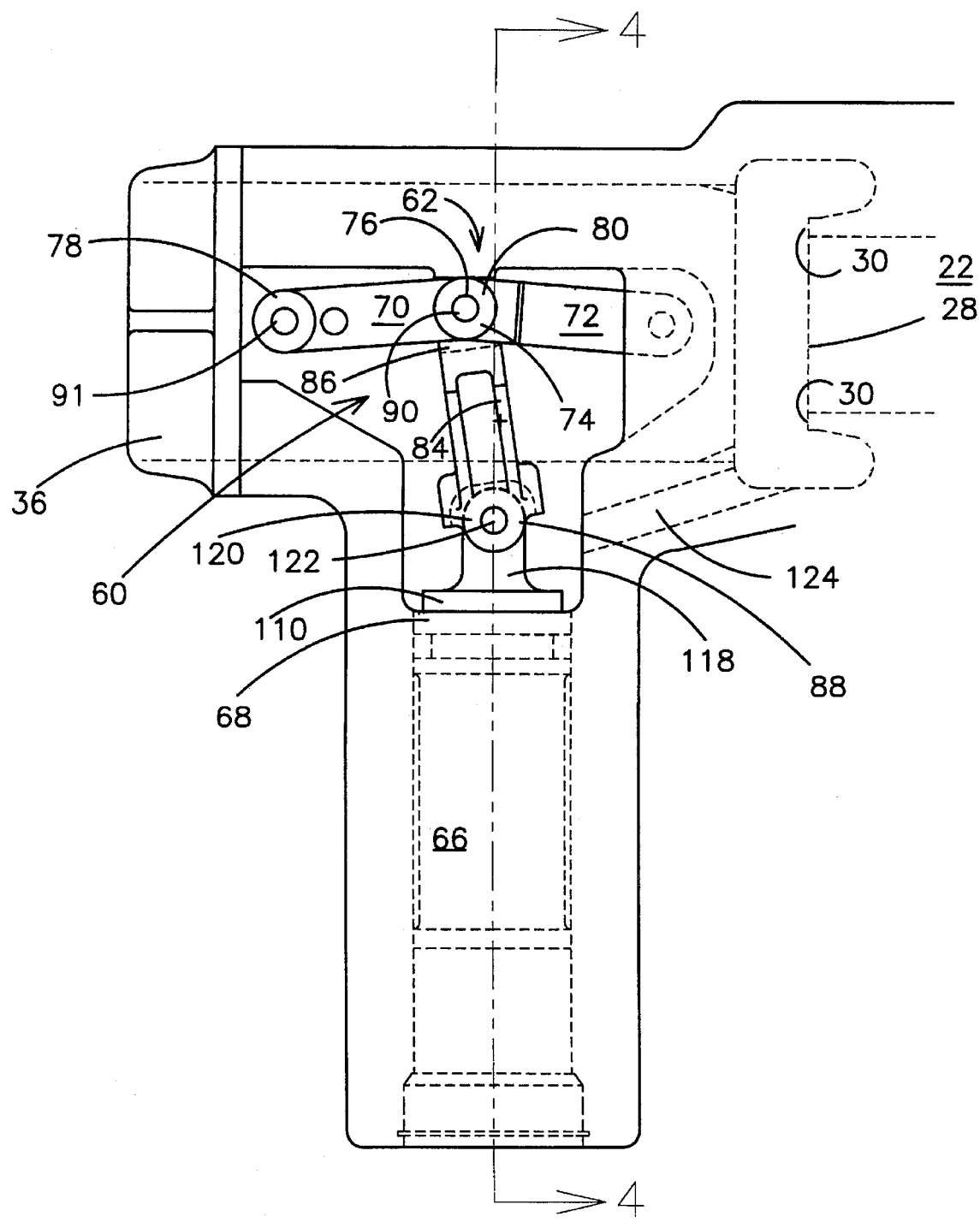
FIG. 3 is a side elevational view of the first valve with the housing broken away to show internal detail.
Figure 4:
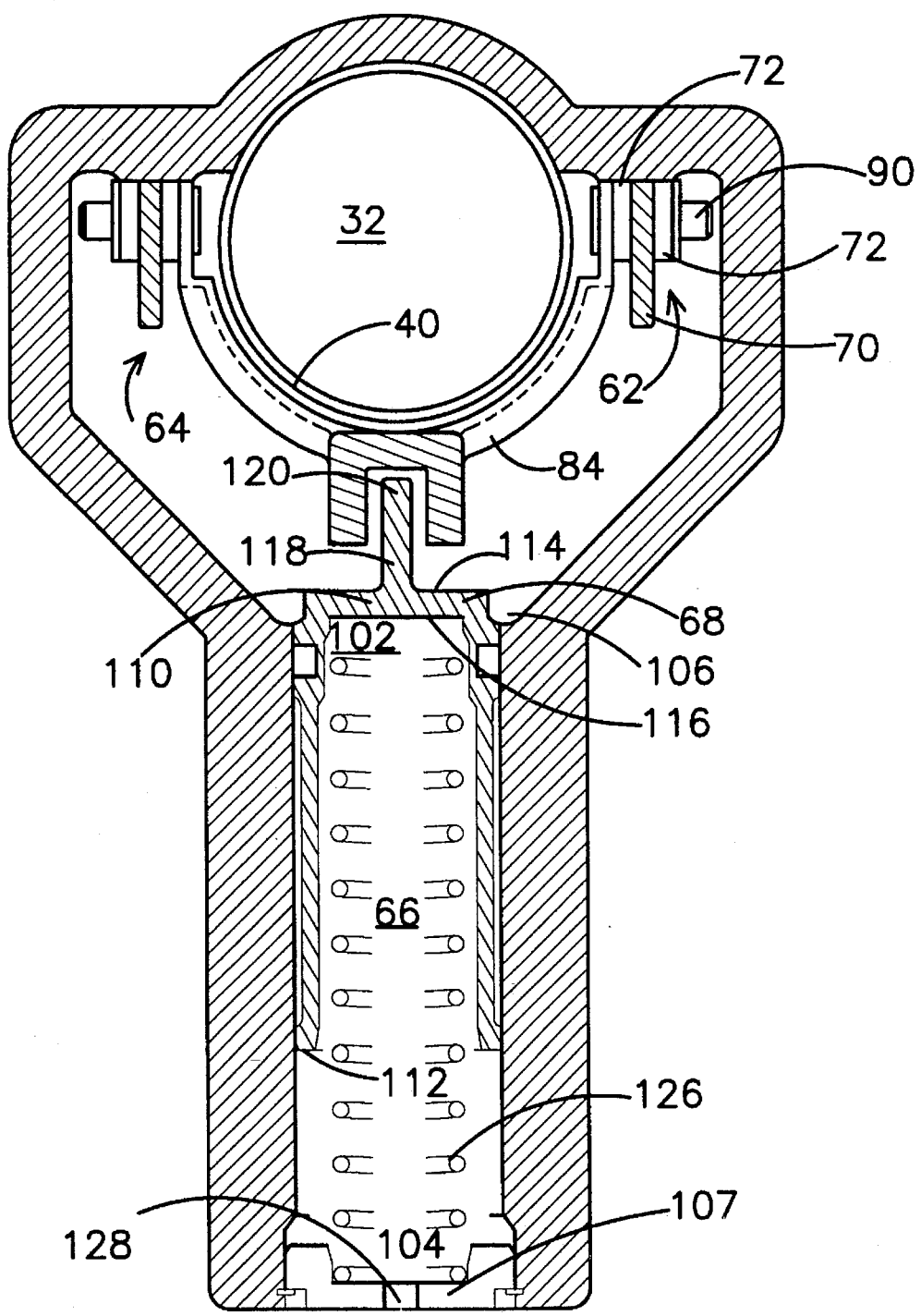
FIG. 4 is a cross sectional view of the first valve taken along the lines 4—4 of FIG. 3.

An automatic safety shut-off system 10 for installation in a gas line or other fluid line which automatically shuts off the flow of fluid in response to an emergency situation is shown in FIG. 1. Shut-off system 10 is shown in FIG. 1 installed in the natural gas supply line to a residence. In the present arrangement, shut-off system 10 is installed downstream of the pressure regulator typically found in residential and commercial gas service. Gas flows through shut-off system 10 into the gas meter and on to the equipment in the home requiring gas, such as the hot water heater and the furnace. A static pressure line 12 extends from the gas using equipment within the home back to shut-off system 10 to provide a reference pressure which is compared with the gas supply pressure, to determine if lower than normal pressure, as defined below, exists downstream of shut-off system 10.

A first valve 20 of shut-off system 10 is shown if FIGS. 2–5. First valve 20 includes a valve body 21 defining a first valve chamber 22 having a first inlet 24 and a first outlet 26. First inlet 24 is engagable with the gas supply line 27 supplying gas from a supplying utility or a gas storage tank. In the present embodiment, first inlet 24 is threaded to receive the gas supply line. Alternatively, gas supply line 27 may be fastened to first valve 20 by any other well known fastening means, including, by adding a flange to first inlet 24 for mating with a corresponding flange on the gas supply line. First outlet 26 is engagable with a discharge line for continuing gas service to the residence or commercial building requiring gas service.

A first valve seat 28 is provided within first valve chamber 22. First valve seat 28 includes a circular protrusion 30. A first sealing piston housing 32 is positioned in registry with first valve seat 28 and communicates with first valve chamber 22 through a first opening 34. An end cap 36 is removably fastened to valve body 21 of first valve 20 thereby enclosing first sealing piston housing 32. A first sealing piston 40 is positioned within first sealing piston housing 32. First sealing piston 40 is generally in the shape of a hollow cylinder having a closed first end 42 and an open second end 44. Closed first end 42 includes a front face 46 having a circular depression 48 therein and a rear face 50. First sealing piston 40 reciprocates through first opening 34 between a first open position allowing gas flow through first valve chamber 22 and a first closed position sealingly abutting first valve seat 28. In the first closed position, circular protrusion 30 sealingly engages a circular elastomeric seal 35, bonded into circular depression 48, thereby interrupting fluid flow through first valve chamber 22. First sealing piston 40 is biased to move to the first closed position by a first spring 52. First spring 52 engages end cap 36 at one end and rear face 50 of closed first end 42 at the other end. FIGS. 2–5 show sealing piston 40 in the open position allowing gas flow through valve chamber 22.

A pressure responsive locking mechanism 60 retains first sealing piston 40 in the first open position and allows first sealing piston 40 to move to the first closed position in response to above normal gas pressure, as defined below, in first valve chamber 22. The main components of pressure responsive locking mechanism 60 include a first locking toggle joint 62, a second locking toggle joint 64, a locking piston housing 66, and a locking piston 68.

First locking toggle joint 62 and second locking toggle joint 64 are symmetrically disposed within first sealing piston housing 32. Second locking toggle joint 64 is a mirror image of first locking toggle joint 62 and is otherwise identical to first locking toggle joint 62. Therefore, only first toggle joint 62 will be discussed.

First locking toggle joint 62 includes a first bar 70 and a second bar 72 which are joined together end to end at a first joint 74. First bar 70 includes two opposing rounded ends 76 and 78, each end having a hole bored therethrough. Second bar 72 includes a Y-shaped first end 80 having opposing parallel holes bored therethrough and a rounded second end 82 having a hole bored therethrough. A third bar 84, shaped into a semi-circular arc, extends from first joint 74 along the circumference of first sealing piston 40. Third bar 84 includes a first rounded end 86 having a hole bored therethrough and a second rounded end 88 having a hole bored therethrough. First joint 74 includes a toggle pin 90 which passes through the hole in first rounded end 86 of third bar 84, the holes in Y-shaped first end 80 of second bar 72, and the hole in rounded first end 76 of first bar 70. Rounded second end 78 of first bar 70 pivots about a first pivot shaft 91 mounted to first sealing piston 40. Second bar 72 extends through a chamber 92 in sealing piston housing 32 to allow rounded second end 82 of second bar 72 to engage and pivot about a second pivot shaft 94 mounted to sealing piston housing 32.

First toggle joint 62 and second toggle joint 64 move in synchrony between a third locked and a third unlocked position. First toggle joint 62 and second toggle joint 64 retain first sealing piston 40 in the first open position when first toggle joint 62 and second toggle joint 64 are in the third locked position. First toggle joint 62 and second toggle joint 64 allow first sealing piston 40 to move to the closed position when first toggle joint 62 and second toggle joint 64 are in the third unlocked position.

Cylindrical locking piston housing 66 is positioned perpendicularly to sealing piston housing 32 and includes a first end 102 and a second end 104. Locking piston housing 66 communicates with sealing piston housing 32 through an opening 106 in locking piston housing 66 located at first end 102. A plug 107 sealingly engages second end 104 of locking piston housing 66. A locking piston 68 is housed within locking piston housing 66. Locking piston 68 is generally in the shape of a hollow cylinder having a closed first end 110 and an open second end 112. Closed first end 110 includes a front face 114 and a rear face 116. A pivot point 118 having a rounded end 120 including a hole therethrough extends perpendicularly from front face 114. A pin 122 extends through rounded end 120 and engages the hole in second rounded end 88 of third bar 84 of first toggle joint 62 and similarly engages second toggle joint 64. Locking piston 68 is movable between a second locked position locking first toggle joint 62 and second toggle joint 64 in the first locked position and a second unlocked position unlocking first toggle joint 62 and second toggle joint 64 to allow first sealing piston 40 to move into the first closed position. A second spring 126 biases locking piston 68 in the second locked position. Second spring 126 engages rear face 116 of locking piston 68 at one end and plug 107 at the other end. A fluid conduit 124 is positioned between first outlet 26 of first valve chamber 22 and sealing piston housing 32. Plug 107 includes an opening 128 to engage a vent line to the ambient atmosphere.

In the third locked position, the longitudinal axes of the first bars and the second bars of first toggle joint 62 and second toggle joint 64 are aligned such that the moments of the reaction forces at either end of the toggle joints, about the toggle pins, is zero. Preferably, when the toggle joints are in the third locked position, the toggle pins are moved past the position of perfect alignment of the longitudinal axes of the first and second bars, such that the toggle joints are slightly bent in a direction opposite to that in which the toggle joints bend when they are being unlocked. When the first and second bars of the toggle joints are in the third locked position, i.e. are slightly out of alignment, further bending of the joints is prevented by the third bars of the toggle joints abutting against valve body 21. Alternatively, a shoulder can be milled into locking piston housing 66 to act as a stop for locking piston 68, thus preventing further bending of the toggle joints when the joints are in the third locked position.

Above normal gas pressure within valve chamber 22 will cause pressure responsive locking mechanism 60 to free sealing piston 40 to move to the first closed position and, thereby, interrupt gas flow through first valve 20. The regulated pressure of gas entering first valve 20 through first inlet 24 from the supply line is normally be between 2–3 psig. If the regulator were to fail, supply pressure may reach 40–65 psig. First valve 20 is set to a threshold pressure of 10 psig at which pressure the valve will close. Gas pressure of 10 psig or greater within valve chamber 22 and sealing piston housing 32 (through fluid conduit 124) will overcome the spring bias from second spring 126 and force locking piston 68 in a direction away from sealing piston housing 32. The toggle pins of first toggle joint 62 and second toggle joint 64 move in conjunction with sealing piston 68. Once the toggle pins pass through the point of perfect alignment of the longitudinal axis of the first and second bars, first spring 52 forces sealing piston 40 to sealingly engage first valve seat 28 and interrupt gas flow through valve chamber 22. The threshold pressure for closing valve 20 may be changed by varying the spring constant of second spring 126.

A reset button 130 having a reset shaft 132 is provided to manually reset first valve 20 after closure of the valve due to above normal supply pressure in the supply line. Reset shaft 132 engages front face 46 of sealing piston 40. When sealing piston 40 moves to the closed position, reset button 130 is forced away from valve body 21 thereby indicating valve closure. Once normal supply pressure is restored, reset button 130 may be used to return sealing piston 40 to the open position. Preferably, a third spring is provided along reset shaft 132 to bias reset button 130 toward valve body 21 and assist a user in resetting first valve 20.

Figure 5:
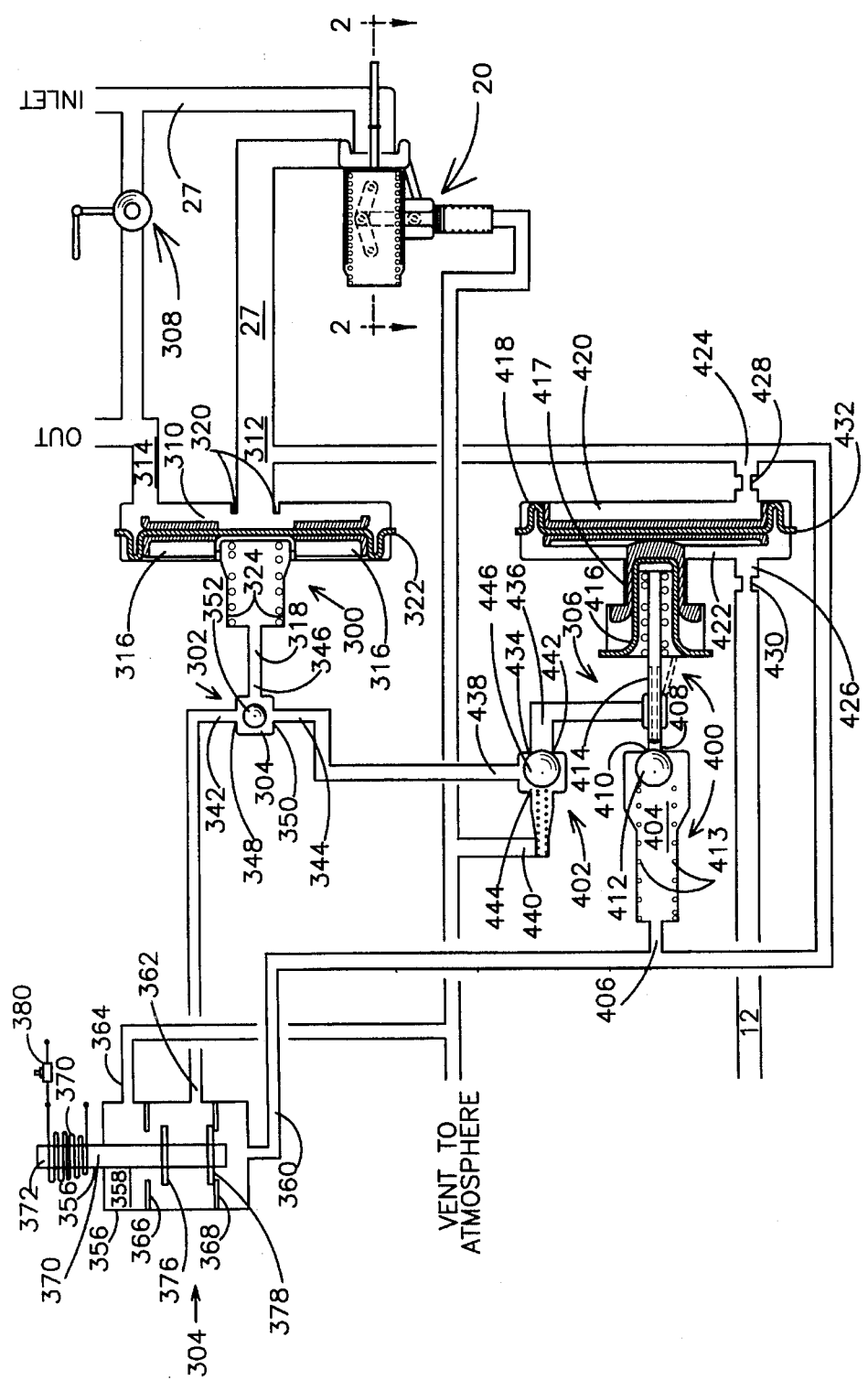
FIG. 5 is schematic diagram showing the details of the gas shut-off system of the present invention.

FIG. 5 shows a schematic of the components of shut-off system 10, including first valve 20. The major components of the system include first valve 20, gas supply line 27, second valve 300, priority valve 302, third valve 304, fourth valve 306, and manual bypass valve 308.

Second valve 300 includes a second valve chamber 310 having a first conduit 312 and a second conduit 314 and a third valve chamber 316 having a third conduit 318. First conduit engages fluid supply line 27. A second valve seat 320 is positioned at first conduit 312. A first flexible diaphragm 322 divides second valve 300 into second valve chamber 310 and third valve chamber 316. First flexible diaphragm 322 is movable between a second open position allowing fluid flow through second valve chamber 310 and a second closed position sealingly abutting second valve seat 320. First diaphragm 322 is biased by a fourth spring 324 to move to the second closed position, whereby equalized pressure between second valve chamber 310 and third valve chamber 316 causes first diaphragm 322 to move to the second closed position. FIG. 5 shows second valve 300 in the second open position.

Priority valve 302 includes a fourth valve chamber 340 having a fourth conduit 342, a fifth conduit 344, and a sixth conduit 346. Sixth conduit 346 communicates with third conduit 318 of second valve 300. A third valve seat 348 is provided at fourth conduit 342 and a fourth valve seat 350 is provided at fifth conduit 344. A first pressure responsive valve member 352 is movable between a first position, a second position, and a third position. In the first position, first pressure responsive valve member 352 sealingly abuts third valve seat 348 to allow fluid communication between fifth conduit 344 and sixth conduit 346. In the second position, first pressure responsive valve member 352 sealingly abuts fourth valve seat 350 to allow fluid communication between fourth conduit 342 and sixth conduit 346. In the third position, the gas pressure within fourth conduit 342, fifth conduit 344, and sixth conduit 346 is equalized, permitting first pressure responsive valve member 352 to allow fluid communication between all of three the aforesaid conduits. FIG. 5 shows priority valve 302 in the third position.

Third valve 304 is an electrically controlled solenoid valve including a valve housing 356 defining a valve chamber 358. Valve chamber 358 includes a seventh conduit 360, an eighth conduit 362, and a vent conduit 364 to the ambient atmosphere. Eighth conduit 362 communicates with fourth conduit 342 of priority valve 302. Seventh conduit 360 communicates with fluid supply line 27. A first valve seat 366 is positioned to seal off eighth conduit 362 from vent conduit 364. A second valve seat 368 is positioned to seal off eighth conduit 362 from seventh conduit 360. First valve seat 366 and second valve seat 368 are positioned in registry with one another such that a shaft 370 may selectively engage one of the aforementioned valve seats. Shaft 370, having a first end 372, passes through an opening in valve housing 356.

A solenoid 374 surrounds first end 372 of shaft 370. A first valve member 376 is mounted on shaft 370 to selectively engage first valve seat 366. A second valve member 378 is mounted on shaft 370 to selectively engage second valve seat 368. When solenoid 374 is energized, shaft 370 is moved to a first position in which second valve member 378 sealingly engages second valve seat 368 to provide communication between vent conduit 364 and eighth conduit 362. Solenoid 374 de-energizes upon interruption of electrical power supplied to machinery using gas supplies through shut-off system 10, moving shaft 370 to a second position. In the second position, first valve member 376 sealingly engages first valve seat 368 to provide communication between seventh conduit 360 and eighth conduit 362. FIG. 5 shows solenoid 374 energized and shaft 370 in the first position. Shaft 370 is spring biased to the second position by a spring (not shown in FIG. 5 for reasons of clarity).

Solenoid 374 is provided with a manual reset switch 380 to restore shaft 370 to the first position once power is restored and solenoid 374 is re-energized, thereby restoring fluid flow through third valve 304. Reset switch 380 is included to prevent automatic resumption of gas flow through third valve 304 once electrical power is restored to solenoid 374, i.e. the reset switch must be manually reset for flow to be restored through the valve. Preferably, reset switch 380 includes an electrical circuit of well known design and is positioned within the building receiving gas service through shut-off system 10, preferably near the fuse box. Alternatively, manual reset switch 380 may be an electro-mechanical device of well known construction.

Fourth valve 306 is an abnormal pressure loss sensing assembly the major components of which include a stage one valve 400 and a stage two valve 402.

Stage one valve 400 includes a fifth valve chamber 404 having a ninth conduit 406 and a tenth conduit 408. Ninth conduit 406 communicates with fluid supply line 27. A fifth valve seat 410 is positioned at tenth conduit 408. A second pressure responsive valve member 412 is provided and is movable between a third open position, allowing gas flow between ninth conduit 406 and tenth conduit 408, and a third closed position sealingly engaging fifth valve seat 410. Second pressure responsive valve member 412 is biased to the third closed position by a fifth spring 413. FIG. 5 shows second pressure responsive valve member 412 in the third closed position.

Stage one valve 400 further includes a second piston housing 414 positioned in registry with fifth valve seat 410 and in fluid communication with fifth valve chamber 404. A second sealing piston 416 is positioned within second piston housing 414 and is movable between a fourth open position and a fourth closed position. Second sealing piston 416 is in the form of a flexible diaphragm that is protected from wear by a protective cap 417. In the fourth open position second pressure responsive valve member 412 is moved to said third open position and in the fourth closed position second pressure responsive valve member 412 is allowed to move to the third closed position. FIG. 5 shows second sealing piston in the fourth closed position.

A diaphragm housing 418 having a sixth chamber 420 and seventh chamber 422 is included in stage one valve 400. Sixth chamber 420 includes an eleventh conduit 424 and seventh chamber 422 includes a twelfth conduit 426. Eleventh conduit 424 is in fluid communication with fluid supply line 27 and twelfth conduit 426 is in fluid communication with static pressure line 12. A first restriction orifice 428 is positioned within eleventh conduit 424 and a second restriction orifice 430 is positioned within twelfth conduit 426. A flexible second diaphragm 432 divides diaphragm housing 418 into sixth chamber 420 and seventh chamber 422. Second diaphragm 432 engages second sealing piston 414 and is movable in response to a pressure difference between sixth chamber 420 and seventh chamber 422, whereby below normal pressure, as defined below, downstream of shut-off system 10 and in seventh chamber 422 (through static pressure line 12) causes second diaphragm 432 to move second sealing piston 416 into the fourth closed position.

Stage two valve 402 includes an eighth valve chamber 434 having a thirteenth conduit 436, a fourteenth conduit 438, and a vent conduit 440 to the ambient atmosphere. Thirteenth conduit 436 communicates with tenth conduit 408 of stage one valve 400 and fourteenth conduit 438 communicates with fifth conduit 344 of priority valve 302. Stage two valve 402 includes a sixth valve seat 442 provided at thirteenth conduit 436 and a seventh valve seat 444 positioned at vent conduit 440. A third pressure responsive valve member 446 is provided and is movable between a fifth open position and a fifth closed position. In the fifth closed position, third pressure responsive valve member 446 sealingly engages sixth valve seat 442 and allows fluid at atmospheric pressure to flow to priority valve 302 through fifth conduit 344. In the fifth open position, third pressure responsive valve member 446 sealingly engages seventh valve seat 444 and to allow gas at supply pressure from supply line 27 to flow to priority valve 302. Third pressure responsive valve member 446 is biased to the fifth closed position by a sixth spring 448. FIG. 5 shows third pressure responsive valve member 446 in the fifth closed position.

Manual bypass valve 308 is provided to permit manual resumption of gas flow through shut-off system 10 in the event of automatic closure of the system in response to an emergency condition.

Shut-off system 10 automatically interrupts gas flow to a building in response to three emergency conditions: above normal supply gas pressure, below normal downstream pressure, and loss of electrical power. FIG. 5 shows shut-off system in normal operation in the absence of any of the aforesaid emergency conditions. The gas pressure within second valve chamber 310 of second valve 300 is the normal supply gas pressure, as discussed above. The fluid within third valve chamber 316 of second valve 300 is at atmospheric pressure as priority valve 302 is the third position allowing ambient air to enter third valve chamber 316 through third valve 304 and fourth valve 306. The pressure differential between second valve chamber 310 and third valve chamber 316 provides sufficient force to overcome the spring bias on first diaphragm 322, thus allowing gas flow through second valve 300 and shut off system 10.

Closure of shut-off system 10 in response to above normal supply gas pressure is detailed above in the discussion of first valve 20.

In the event of the interruption of electrical power supplied to machinery using gas supplied through shut-off system 10, solenoid 374 of third valve 304 will de-energize. Shaft 370 will move to the second position allowing fluid communication between seventh conduit 360 and eighth conduit 362. Gas at the normal supply pressure flows through third valve 304 to priority valve 302, moving first pressure responsive valve member 352 to the second position and allowing fluid communication between fourth conduit 342 and sixth conduit 346. Gas at normal supply pressure continues through third conduit 318 into third valve chamber 316 of second valve 300. The fluid pressure within third valve chamber 316 and second valve chamber 310 is equalized thus allowing fourth spring 324 to move first diaphragm 322 to the second closed position thereby interrupting gas flow through shut-off system 10.

In the event of an abnormal pressure loss downstream of shut-off system 10, fluid flow will be automatically interrupted through the system. Static pressure line 12 provides a reference pressure to the fourth valve from the gas using equipment downstream of shut-off system 10. In normal operation, the pressure difference between sixth chamber 420 and seventh chamber 422 in not sufficient to overcome the spring bias on second diaphragm 432. Thus, second pressure responsive member 412 remains in the third closed position preventing the communication of gas at the supply pressure to stage two valve 402. Third pressure responsive valve member 446 remains in the fifth closed position allowing fluid at atmospheric pressure to flow through stage two valve 402 to priority valve 302.

During the course of normal operation, minor pressure variations downstream of the shut-off system will occur as a result of increased gas demands by equipment. First restriction orifice 428 and second restriction orifice 430 are provided to dampen any transient pressure variations before they reach second diaphragm 432. Thus, the downstream pressure must drop over 25% for a period of 10–25 seconds for shut-off system 10 to interrupt gas flow.

In the event of such an abnormal pressure drop, the pressure differential between sixth chamber 420 and seventh chamber 422 is sufficient to overcome the spring bias on second diaphragm 432 thus moving second sealing piston 416 into the fourth closed position. Gas at the supply pressure flows from ninth conduit 406 to tenth conduit 408 and on to stage two valve 402. The gas pressure within thirteenth conduit 436 is sufficient to overcome the spring bias on third pressure responsive valve member 446. Third pressure responsive valve member 446 moves to the fifth open position allowing gas at supply pressure to flow to priority valve 302. First pressure responsive valve member 352 moves to the first position, allowing fluid communication between fifth conduit 344 and sixth conduit 346. Gas at normal supply pressure continues through third conduit 318 into third valve chamber 316 of second valve 300. The pressure within third valve chamber 316 and second valve chamber 310 is equalized thus allowing fourth spring 324 to move first diaphragm 322 to the second closed position thereby interrupting gas flow through shut-off system 10.

It is to be understood that the present invention is not limited to the sole embodiment described above, but encompasses any and all embodiments within the scope of the following claims.

I claim:

1. A fluid shut-off system comprising:
   a first valve including:
      a first valve chamber having a first inlet and a first outlet, said inlet being engagable with a fluid supply line supplying fluid at a supply pressure;
      a first valve seat provided at one of said inlet and said outlet;
      a first sealing piston housing positioned in registry with said first valve seat and communicating with said first valve chamber;
      a first sealing piston positioned within said first sealing piston housing, said first sealing piston being movable between a first open position allowing fluid flow through said first valve chamber and a first closed position sealingly abutting said first valve seat, said sealing piston being biased to move to said first closed position; and
      a pressure responsive locking mechanism retaining said first sealing piston in said first open position and allowing said first sealing piston to move to said first closed position in response to above normal fluid pressure in said first valve chamber; and
   a second valve acting to interrupt fluid flow through said fluid shut-off system in response to lower than normal pressure downstream of said shut-off system.

2. The fluid shut-off system according to claim 1, further including a second valve acting to interrupt fluid flow through said fluid shut-off system in response to interruption of electrical power supplied to machinery using fluid from said fluid supply line.

3. The fluid shut-off system according to claim 1, further including a second valve acting to interrupt fluid flow through said fluid shut-off system in response to lower than normal pressure downstream of said shut-off system and a third valve acting to interrupt fluid flow through said fluid shut-off system in response to interruption of electrical power supplied to machinery using fluid from said fluid supply line.

4. The fluid shut-off system according to claim 3, wherein said third valve further includes a manual reset switch for restoring fluid flow through said fluid shut-off system once electrical power is restored.

5. The fluid shut-off system according to claim 1, wherein said pressure responsive locking mechanism of said first valve comprises:
   a first locking toggle joint having a first toggle pin, said first toggle joint movable between a first locked and a first unlocked position, said first toggle joint retaining said first sealing piston in said first open position when said first toggle joint is in the first locked position;
   a locking piston housing being in fluid communication with said first valve chamber; and
   a locking piston housed within said locking piston housing, said locking piston being linked to said first toggle pin, said locking piston movable between a second locked position locking said first toggle joint in said first locked position and a second unlocked position unlocking said first toggle joint to allow said first sealing piston to move into said first closed position, whereby above normal fluid pressure in said first valve chamber causes movement of said locking piston from said second locked position to said second unlocked position, said locking piston being biased to move to the second locked position.

6. The fluid shut-off system according to claim 5, wherein said pressure responsive locking mechanism further comprises a second locking toggle joint having a second toggle pin, said locking piston being linked to said second toggle pin, said second toggle joint being symmetrically disposed with respect to said first locking toggle joint and moving in synchrony therewith between a third locked and a third unlocked position, said second toggle joint retaining said first sealing piston in said first open position when said second toggle joint is in the third locked position.

7. The fluid shut-off system according to claim 6, further including a second valve acting to interrupt fluid flow through said fluid shut-off system in response to lower than normal pressure downstream of said shut-off system.

8. The fluid shut-off system according to claim 6, further including a second valve acting to interrupt fluid flow through said fluid shut-off system in response to interruption of electrical power supplied to machinery using fluid from said fluid supply line.

9. The fluid shut-off system according to claim 6, further including a second valve acting to interrupt fluid flow through said fluid shut-off system in response to lower than normal pressure downstream of said shut-off system and a third valve acting to interrupt fluid flow through said fluid shut-off system in response to interruption of electrical power supplied to machinery using fluid from said fluid supply line.

10. The fluid shut-off system according to claim 9, wherein said third valve further includes a manual reset switch for restoring fluid flow through said fluid shut-off system once electrical power is restored.

11. The fluid shut-off system according to claim 1, wherein said first valve further includes a reset switch engaging said first sealing position and capable of moving said first sealing piston to said first open position.

12. The fluid shut-off system according to claim 11, wherein said pressure responsive locking mechanism of said first valve comprises:
 a first locking toggle joint having a first toggle pin, said first toggle joint movable between a first locked and a first unlocked position, said first toggle joint retaining said first sealing piston in said first open position when said first toggle joint is in the first locked position;
 a locking piston housing being in fluid communication with said first valve chamber; and
 a locking piston housed within said locking piston housing, said locking piston being linked to said first toggle pin, said locking piston movable between a second locked position locking said first toggle joint in said first locked position and a second unlocked position unlocking said first toggle joint to allow said first sealing piston to move into said first closed position, whereby above normal fluid pressure in said first valve chamber causes movement of said locking piston from said second locked position to said second unlocked position, said locking piston being biased by to move to the second locked position.

13. The fluid shut-off system according to claim 12, wherein said pressure responsive locking mechanism further comprises a second locking toggle joint having a second toggle pin, said locking piston being linked to said second toggle pin, said second toggle joint being symmetrically disposed with respect to said first locking toggle joint and moving in synchrony therewith between a third locked and a third unlocked position, said second toggle joint retaining said first sealing piston in said first open position when said second toggle joint is in the third locked position.

14. The fluid shut-off system according to claim 13, further including a second valve acting to interrupt fluid flow through said fluid shut-off system in response to lower than normal pressure downstream of said shut-off system.

15. The fluid shut-off system according to claim 13, further including a second valve acting to interrupt fluid flow through said fluid shut-off system in response to interruption of electrical power supplied to machinery using fluid from said fluid supply line.

16. The fluid shut-off system according to claim 13, further including a second valve acting to interrupt fluid flow through said fluid shut-off system in response to lower than normal pressure downstream of said shut-off system and a third valve acting to interrupt fluid flow through said fluid shut-off system in response to interruption of electrical power supplied to machinery using fluid from said fluid supply line.

17. The fluid shut-off system according to claim 16, wherein said third valve further includes a manual reset switch for restoring fluid flow through said fluid shut-off system once electrical power is restored.

18. The fluid shut-off system according to claim 13, further comprising:
 a second valve including:
 a second valve chamber having a first conduit and a second conduit, said first conduit being engagable with a fluid supply line supplying fluid at a supply pressure;
 a third valve chamber having a third conduit,
 a second valve seat positioned at one of said first conduit of said second valve and said second conduit of said second valve,
 a first flexible diaphragm dividing said second valve into said second valve chamber and said third valve chamber, said first flexible diaphragm movable between a second open position allowing fluid flow through said second valve chamber and a second closed position sealingly abutting said second valve seat, said first diaphragm being biased to move to said second closed position, whereby equalized pressure between said second valve chamber and third valve chamber causes said first diaphragm to move to said second closed position;
 a priority valve including:
 a fourth valve chamber having a fourth conduit, a fifth conduit, and a sixth conduit, said sixth conduit connected to said third conduit of said second valve,
 a third valve seat provided at said fourth conduit and a fourth valve seat provided at said fifth conduit,
 a first pressure responsive valve member movable between a first position sealingly abutting said third valve seat and a second position sealingly abutting said fourth valve seat;
 an electrically controlled solenoid valve having a seventh conduit, an eighth conduit connected to said first conduit of said priority valve, and a vent conduit to the ambient atmosphere, said seventh conduit being engagable with a fluid supply line supplying fluid at a supply pressure, said solenoid valve providing communication between said eighth conduit of said solenoid valve and said vent conduit of said solenoid valve when in the energized position, said solenoid valve providing communication between said seventh conduit of said solenoid valve and said eighth conduit of said solenoid valve when in the de-energized position, whereby loss of electrical power to said solenoid valve causes said first pressure responsive valve member of said priority valve to move to said first position thus allowing fluid supply pressure to enter said third chamber of said second valve thereby moving said first diaphragm into said second closed position, said solenoid including a manual reset switch for restoring communication between said eighth conduit of said solenoid valve and said vent conduit of said solenoid valve once the solenoid is re-energized, thereby restoring fluid flow through said shut-off system; and an abnormal pressure loss sensing assembly including:
 a stage one valve having:
  a fifth valve chamber, said valve chamber having a ninth conduit and a tenth conduit, said ninth conduit engagable with a fluid supply line supplying fluid at a supply pressure,
  a fifth valve seat positioned at said tenth conduit,
  a second pressure responsive valve member movable between a third open position allowing fluid flow through said fifth valve chamber and a third closed position sealingly engaging said fifth valve seat,
  a second piston housing positioned in registry with said fifth valve seat and communicating with said fifth valve chamber,
  a second sealing piston positioned within said second piston housing, said second sealing piston being movable between a fourth open position and a fourth closed position, said fourth open position allowing said second pressure responsive valve member to move to said third open position, said fourth closed position moving said second pressure responsive valve member to said third closed position,
  a diaphragm housing having a sixth and seventh chamber, said sixth chamber having an eleventh conduit, said seventh chamber having a twelfth conduit, said eleventh conduit engagable with a fluid supply line supplying fluid at a supply pressure, said twelfth conduit engagable with a fluid pressure reference line supplying fluid at a reference pressure, a flexible second diaphragm dividing said diaphragm housing into said sixth chamber and said seventh chamber, said second diaphragm engaging said second sealing piston and movable in response to a pressure difference between said sixth and seventh chamber, whereby below normal reference pressure in said seventh chamber causes said second diaphragm to move said second sealing piston into said fourth closed position,
 a stage two valve having an eighth valve chamber, said eighth valve chamber having a thirteenth conduit, a fourteenth conduit, and a vent conduit to the ambient atmosphere, said thirteenth conduit of said stage two valve connected to said tenth conduit of said stage one valve, said fourteenth conduit of said stage two valve connected to said fifth conduit of said priority valve, said stage two valve having a sixth valve seat provided at said thirteenth conduit and a seventh valve seat positioned at said vent conduit of said stage two valve, said stage two valve having a third pressure responsive valve member movable between a fifth open position and a fifth closed position, said fifth closed position sealingly engaging said sixth valve seat and allowing fluid at atmospheric pressure to flow to said priority valve, said fifth open position engaging said seventh valve seat and allowing fluid at said supply pressure to flow to said priority valve, said third valve member being biased to said fifth closed position.

* * * * *

UNITED STATES PATENT AND TRADEMARK OFFICE
CERTIFICATE OF CORRECTION

PATENT NO. : 5,588,464
DATED : December 31, 1996
INVENTOR(S) : Gordon Tylosky

It is certified that error appears in the above-indentified patent and that said Letters Patent is hereby corrected as shown below:

On the title page: Item [76] "3461" should read --9461--.

Signed and Sealed this

Eighteenth Day of March, 1997

Attest:

BRUCE LEHMAN

Attesting Officer

Commissioner of Patents and Trademarks